(12) United States Patent
Chen

(10) Patent No.: US 10,637,270 B2
(45) Date of Patent: Apr. 28, 2020

(54) BATTERY CHARGING CIRCUIT AND CHARGING METHOD THEREOF

(71) Applicant: ANPEC ELECTRONICS CORPORATION, Hsinchu (TW)

(72) Inventor: Chih-Ning Chen, Taipei (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 0 days.

(21) Appl. No.: 16/395,442

(22) Filed: Apr. 26, 2019

(65) Prior Publication Data

US 2019/0252890 A1    Aug. 15, 2019

Related U.S. Application Data

(63) Continuation-in-part of application No. 15/458,190, filed on Mar. 14, 2017, now abandoned.

(30) Foreign Application Priority Data

Nov. 18, 2016   (TW) .............................. 105137872 A

(51) Int. Cl.
*H02J 7/00*   (2006.01)
*H01M 10/44*   (2006.01)

(52) U.S. Cl.
CPC .............. *H02J 7/008* (2013.01); *H01M 10/44* (2013.01); *H02J 7/007* (2013.01)

(58) Field of Classification Search
CPC ........................................................ H02J 7/008
USPC ......................................................... 320/162
See application file for complete search history.

(56) References Cited

U.S. PATENT DOCUMENTS

| 2007/0216407 | A1* | 9/2007 | Yamaguchi | G01R 31/3648 324/256 |
| 2016/0190831 | A1* | 6/2016 | Mori | B60L 11/1809 320/162 |
| 2017/0222450 | A1* | 8/2017 | Lee | H02J 7/007 |

* cited by examiner

*Primary Examiner* — Jerry D Robbins
(74) *Attorney, Agent, or Firm* — Li & Cai Intellectual Property (USA) Office

(57) ABSTRACT

A battery charging circuit for charging a battery is provided. The battery charging circuit includes a control module and a charging mode adjusting module. The charging mode adjusting module adjusts a charging mode according to a voltage value or a current value or an internal resistor of the battery. The charging mode adjusting module includes a charging unit and a detecting unit. The charging unit provides a charging current or a charging voltage to charge the battery. The detecting unit is electrically connected to the charging unit to detect the voltage value or the current value or the internal resistor of the battery.

8 Claims, 10 Drawing Sheets

BATTERY CHARGING CIRCUIT AND CHARGING METHOD THEREOF

CROSS-REFERENCE TO RELATED PATENT APPLICATION

This application is a continuation-in-part application of and claims the priority benefit of a prior application Ser. No. 15/458,190, filed on Mar. 14, 2017, now pending, which claims the priority benefits of Taiwan application serial no. 105137872, filed on Nov. 18, 2016. The entirety of each of the above patent applications is hereby incorporated by reference herein and made a part of this specification.

BACKGROUND

1. Technical Field

The present disclosure generally relates to a battery charging circuit and, more particularly, to a battery charging circuit with a fast charging mode.

2. Description of Related Art

Referring to FIG. 1, the voltage profile of a general charging circuit is shown. During the process of charging a battery, the battery is first charged in a constant-current mode, and then in a constant-voltage mode when a battery external terminal voltage $V_{BATO}$ (the voltage difference between the positive electrode and the negative electrode) of the battery reaches a fully-charged voltage $V_{FULL}$. However, the charging time in the constant-voltage mode is longer because a lowered charging current is used to charge the internal battery voltage to a full voltage in order to regulate the external battery voltage within a safe voltage range. It results in that the battery internal voltage doesn't reach fully-charged voltage $V_{FULL}$ due to voltage drop of a battery internal resistor.

In FIG. 1, curve I represents the battery internal voltage profile of a general charging circuit and curve II represents the sum of the charging voltage and the voltage across internal resistor ($\Delta V_{BIR}$) of the battery. Therefore, during the charging process, after the external terminal voltage $V_{BATO}$ of the battery reaches the fully-charged voltage $V_{FULL}$, the battery voltage is charged in a constant-voltage mode and then the internal voltage $V_{BAT}$ is slowly charged to the fully-charged voltage $V_{FULL}$. However, in the industry, the estimation of the voltage across the battery internal resistor $\Delta V_{BIR}$ is based on empiricism. This may result in battery damage when batteries with identical specifications made by different manufacturers are charged based on the method disclosed in FIG. 1.

Therefore, there is a need in providing a charging circuit that is capable of adaptively detecting the battery internal resistor, and adjusting battery charged voltage dynamically according to actual parameters of a battery.

SUMMARY

In view of the above, the present disclosure provides a battery charging circuit for detecting and charging a battery. The battery includes a battery internal resistor and a battery internal capacitor that are connected to each other. The battery charging circuit includes a charging unit and a detecting unit. The charging unit includes a switch circuit, a voltage divider circuit, a current sensor amplifier, a charge voltage amplifier, a charge current amplifier, an error amplifier and a pulse width modulation (PWM) comparator. The detecting unit includes a first comparator, a second comparator, a third comparator, a capacitor counter, a resistor counter, an arithmetic operation circuit, an amplifier and an adjustable resistor. The switch circuit is connected to the battery and configured to supply a charging current to the battery. The voltage divider circuit is connected to the battery and configured to output a feedback voltage based on a voltage of the battery. The current sensor amplifier is connected to the battery and configured to detect the charging current flowing to the battery to output a sensed charging current. The charge voltage amplifier is connected to the voltage divider circuit and the current sensor amplifier and configured to output a voltage amplified signal according to the feedback voltage and a voltage related to the sensed charging current and the adjustable resistor. The charge current amplifier is connected to the current sensor amplifier and configured to output a current amplified signal according to the sensed charging current and a first reference voltage. The error amplifier has a first error input terminal connected to the charge voltage amplifier and the charge current amplifier. The error amplifier has a second error input terminal connected to the current sensor amplifier, the charge voltage amplifier and the adjustable resistor. The pulse width modulation (PWM) comparator is connected to the error amplifier and a ramp circuit. The first comparator is connected to the voltage divider circuit and configured to output a first comparator signal according to the feedback voltage and a second reference voltage. The second comparator is connected to the charge current amplifier and the charge voltage amplifier and configured to output a second comparator signal according to the current amplified signal and the voltage amplified signal. The third comparator is connected to the current sensor amplifier and configured to output a third comparator signal according to the sensed charging current and a third reference voltage. The capacitor counter is connected to the first comparator and the second comparator and configured to output a capacitor counting signal according to the first comparator signal and the second comparator signal. The resistor counter is connected to the second comparator and the third comparator and configured to output a resistor counting signal according to the second comparator signal and the third comparator signal. The arithmetic operation circuit is connected to the capacitor counter and the resistor counter and configured to output a resistor adjusting signal according to the capacitor counting signal and the resistor counting signal. The first amplifier has a first amplifier input terminal connected to an output terminal of the first amplifier and configured to output an amplifier signal according to an output voltage of the first amplifier and a fourth reference voltage. The adjustable resistor has one terminal connected to the output terminal of the first amplifier, another terminal connected to the second error input terminal and a control terminal connected to the arithmetic operation circuit. The adjustable resistor is adjusted to have a resistance that is equal to that of the battery internal resistor according to the resistor adjusting signal. The error amplifier outputs an error amplified signal to the PWM comparator according to the voltage amplified signal or the current amplified signal and the one terminal of the adjustable resistor, and the PWM comparator outputs a pulse width modulation signal to the switch circuit according to a ramp signal from the ramp circuit and the error amplified signal.

As previously stated, the battery charging circuit according to the present disclosure is capable of adaptively detecting the internal resistance and the internal capacitance of a battery during various charging periods to acquire actual parameters of the battery so as to provide a fast charging mode to charge the battery with shortened charging time in the constant-voltage mode.

In order to further understand the techniques, means and effects of the present disclosure, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

The detailed description set fourth below in connection with the appended drawings is intended as a description of certain embodiments of the present disclosure, and is not intended to represent the only forms that may be developed or utilized. The description sets fourth the various functions in connection with the illustrated embodiments, but it is to be understood, however, that the same or equivalent functions may be accomplished by different embodiments that are also intended to be encompassed within the scope of the present disclosure.

While such terms as "first," "second," "third," etc., may be used to describe various components, such components must not be limited to the above terms. The above terms are used only to distinguish one component from another. For example, a second component may be referred to as a first component within the scope of the present disclosure, and similarly, the first component may be referred to as the second component. As used herein, the term "and/or" includes any and all combinations of one or more of the associated listed items.

The battery charging circuit will be exemplified by at least one embodiment with reference to the figures herein. However, the at least one embodiment is not intended to limit the scope of the present disclosure.

Embodiment of Battery Charging Circuit

Figure 1:
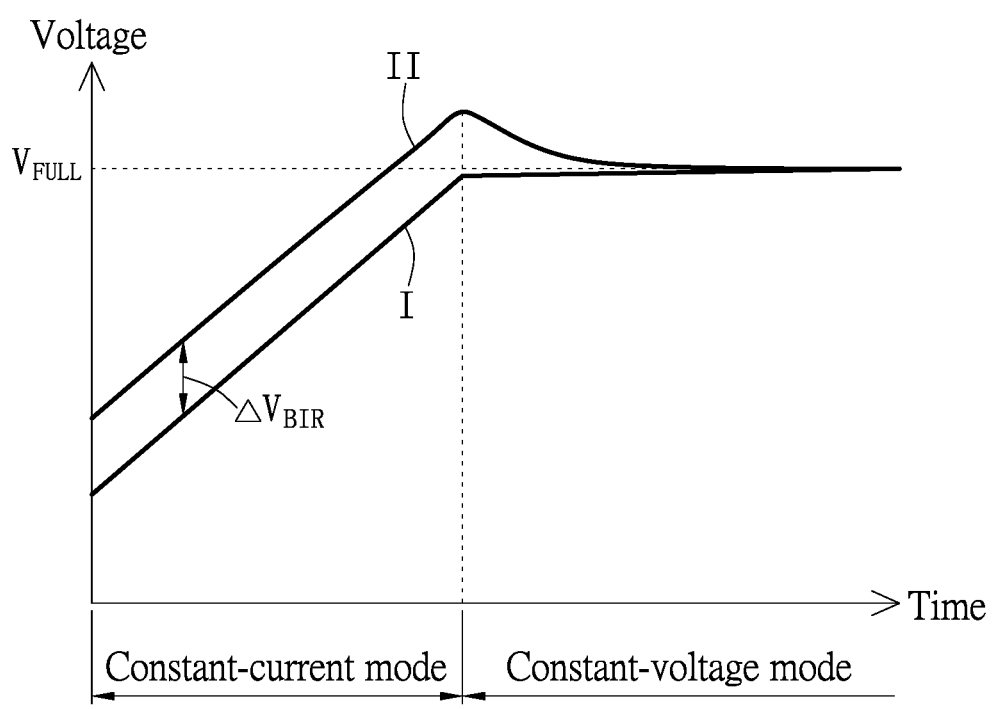
FIG. 1 shows the voltage profile of a general charging circuit.
Figure 2:
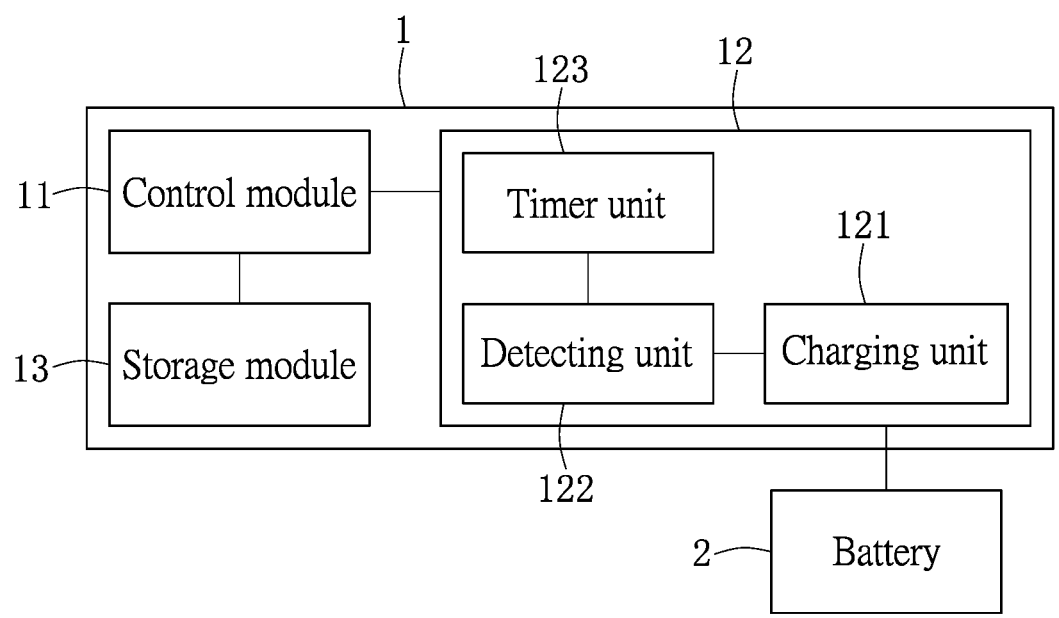
FIG. 2 shows a schematic diagram of a battery charging circuit according to one embodiment of the present disclosure.
Figure 3:
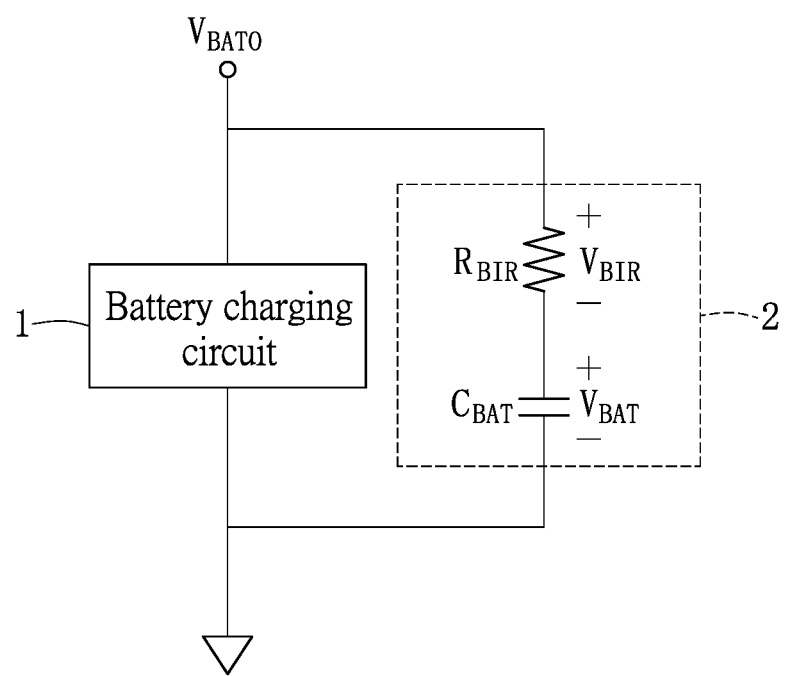
FIG. 3 shows a simplified circuit diagram of a battery charging circuit according to one embodiment of the present disclosure.
Figure 4:
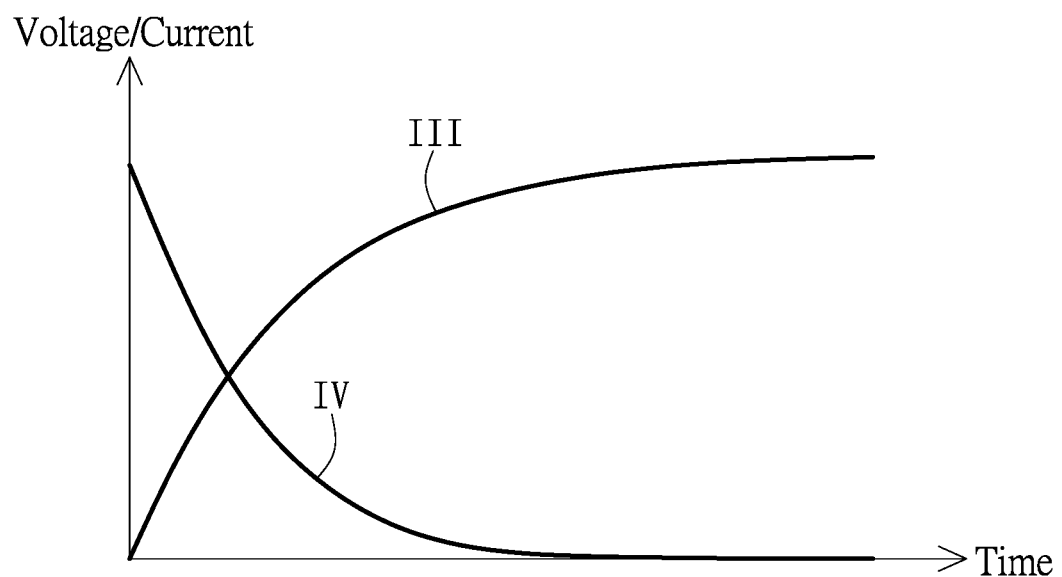
FIG. 4 shows a charging voltage profile and a charging current profile according to one embodiment of the present disclosure.

Referring to FIG. 2 to FIG. 4, FIG. 2 shows a schematic diagram of a battery charging circuit, FIG. 3 shows a simplified circuit diagram of a battery charging circuit, and FIG. 4 shows a charging voltage profile and a charging current profile according to one embodiment of the present disclosure.

The battery charging circuit 1 includes a control module 11, a charging mode adjusting module 12 and a storage module 13. The charging mode adjusting module 12 includes a charging unit 121, a detecting unit 122 and a timer unit 123.

The battery charging circuit 1 is electrically connected to a battery 2 to charge the battery 2 with a charging voltage and a charging current.

The control module 11 is electrically connected to the storage module 13 and the charging mode adjusting module 12.

In the present embodiment, the charging mode adjusting module 12 adjusts a charging mode according to a voltage value or a current value of the battery 2. The charging unit 121 provides the charging current or the charging voltage to charge the battery 2. The detecting unit 122 detects the voltage value or the current value of the battery 2. The timer unit 123 provides a clock signal and detects with the detecting unit 122 a voltage variation of the battery 2 in a time period or a current variation of the charging current of battery charging circuit 1 in a time period. In the present embodiment, the timer unit 123 provides the clock signal in picoseconds.

Referring to FIG. 3, FIG. 3 shows a simplified charging circuit and an equivalent circuit of the battery 2. The equivalent circuit of the battery 2 includes a battery internal resistor $R_{BIR}$ and a battery internal capacitor $C_{BAT}$. In other words, the battery 2 can be simplified by a resistor $R_{BIR}$ and a large capacitor $C_{BAT}$ connected in series. The voltage across the battery internal resistor $R_{BIR}$ and the battery internal capacitor $C_{BAT}$ is the voltage across battery internal resistor ($V_{BIR}$) and the voltage across battery internal capacitor ($V_{BAT}$) of the battery 2, respectively. In other words, the battery external terminal voltage $V_{BATO}$ viewed from the external terminal of the battery 2 equals the sum of the voltage across battery internal resistor ($V_{BIR}$) and the voltage across battery internal capacitor ($V_{BAT}$). Actually, the electricity stored in the battery 2 is the electricity charged with the voltage across battery internal capacitor ($V_{BAT}$), and the voltage across battery internal resistor ($V_{BIR}$) indicates the wasted power consumption in the battery 2. In other words, the battery 2 is completely charged when the voltage across battery internal capacitor ($V_{BAT}$) reaches a fully-charged voltage $V_{FULL}$.

Referring to FIG. 4, curve III and curve IV represent the variations of the voltage across battery internal capacitor and the charging current in the constant-voltage mode during the charging process, respectively, which can be expressed as:

$$Vc = \frac{Q}{C_{BAT}} = E\left(1 - e^{-\frac{t}{R_{BIR} * C_{BAT}}}\right) \tag{1}$$

$$Ic = \frac{E}{R_{BIR}} * e^{\left(-\frac{t}{R_{BIR} C_{BAT}}\right)} \tag{2}$$

In Equations (1) and (2), Vc represents the variation of the voltage across battery internal capacitor ($V_{BAT}$) of the battery 2 during the charging process in the constant-voltage mode, Ic represents the current variation of the battery 2 during the charging process in the constant-voltage mode. More particularly, E represents the charging voltage, $R_{BIR}$ represents the internal resistance of the battery 2, $C_{BAT}$ represents the internal capacitor of the battery 2. According to Equations (1) and (2), when the charging time gets longer, the voltage across battery internal capacitor ($V_{BAT}$) approaches more to the charging voltage E. The charging current gradually decreases to a value lower than a pre-determined value.

Figure 5:
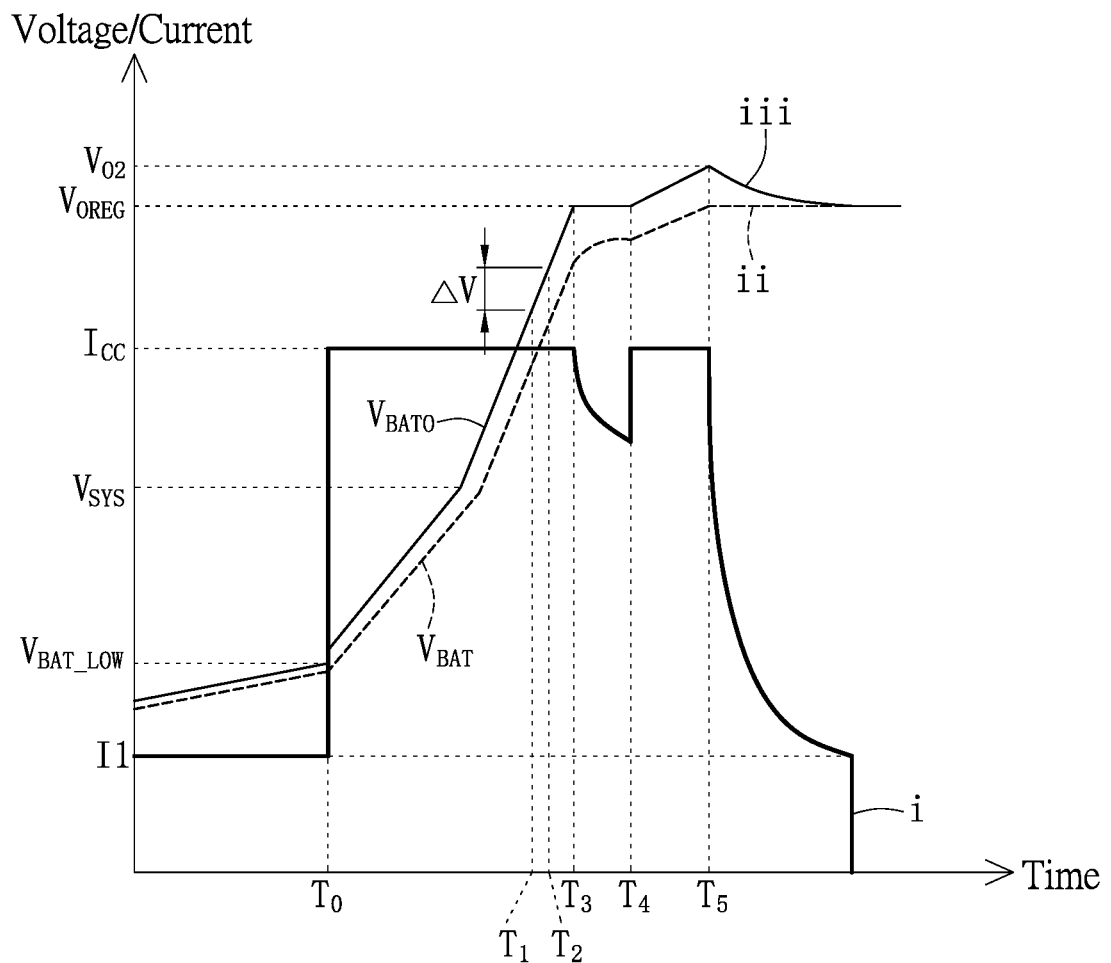
FIG. 5 shows a charging voltage profile and a charging current profile during the charging process of a battery charging circuit according to one embodiment of the present disclosure.

Referring to FIG. 5, FIG. 5 shows a charging voltage profile and a charging current profile during the charging process of a battery charging circuit according to one embodiment of the present disclosure.

In FIG. 5, curve i represents the current-time relation of the charging current, curve ii represents the voltage-time relation of the voltage across battery internal capacitor $V_{BAT}$, and curve iii represents the voltage-time relation of the battery external terminal voltage $V_{BATO}$ of the battery 2.

First, referring to curve i in FIG. 5, at the beginning of the charging process, the battery charging circuit 1 charges the battery 2 with a lower current I1 until the pre-determined time T0 when the external terminal voltage $V_{BATO}$ of the battery 2 is higher. In other words, when the external terminal voltage $V_{BATO}$ of the battery 2 reaches a low battery voltage $V_{BAT\_LOW}$, the battery charging circuit 1 charges the battery 2 with a larger current Icc. In the time period when the battery 2 is charged in the constant-current mode, the charging current continues to charge the battery 2 with the current value Icc. As the electric energy stored in the battery 2 increases, both the voltage across battery internal capacitor $V_{BAT}$ represented by curve ii and the battery external terminal voltage $V_{BATO}$ represented by curve iii increases. When the external terminal voltage $V_{BATO}$ of the battery 2 increases to approach a pre-determined voltage range near a first pre-determined voltage $V_{OREG}$, the detecting unit 122 detects a voltage variation of the battery 2. In FIG. 5, the voltage variation ΔV of the battery external terminal voltage $V_{BATO}$ between the first time $T_1$ and the second time $T_2$ is detected. In the present embodiment, the pre-determined voltage range is determined between the system voltage Vsys and the rated fully-charged voltage $V_{OREG}$. Moreover, in the present embodiment, the pre-determined voltage range is higher than 90% of the rated fully-charged voltage $V_{OREG}$. In other embodiments, the voltage range can be determined differently from the present embodiment, to which the present disclosure is not limited.

Meanwhile, since the battery 2 is charged in the constant-current mode, the external terminal voltage $V_{BATO}$ of the battery continues to increase. The internal capacitor $C_{BAT}$ of the battery 2 can be calculated as below:

$$C_{BAT} = Icc * \frac{(T2 - T1)}{\Delta V} \tag{3}$$

In the present embodiment, when the external terminal voltage $V_{BATO}$ of the battery 2 reaches a rated fully-charged voltage $V_{OREG}$, the charging mode adjusting module 12 operates in the constant-voltage mode, and the charging unit 121 of the battery charging circuit 1 lowers the charging current. In the present embodiment, the charging current starts to drop from the current value Icc at the third time $T_3$. At the fourth time $T_4$, the charging current drops to 90% of the current value Icc. According to Equation 2, the time for the charging current Icc to change by 10% equals 0.1* ($R_{BIR} * C_{BAT}$). The control module 11 of the battery charging circuit 1 calculates the internal resistance $R_{BIR}$ of the battery 2 according to the current variation (10% variation of the charging current Icc) between the third time $T_3$ and the fourth time $T_4$, which can be expressed as:

$$R_{BIR} = (T_4 - T_3)/(0.1 * C_{BAT}) \tag{4}$$

In Equation 4, the time constant in the RC charging/discharging circuit equals the resistance multiplied by the capacitance. In other words, when the charging current drops from 100% of the current value Icc to 90% of the current value Icc, the time is 0.1τ. Equation 4 will be exemplified by actual values herein.

First, if the time for the charging current to drop from 100% of the current value Icc to 90% of the current value Icc is 50 μs, and the capacitance of the battery 2 calculated by Equation (3) is 100 mF, the internal resistance of the battery 2 can be expressed as:

$$R_{BIR} = 50 \text{ μs}/(0.1 * 100 \text{ mF}) = 5 \text{ mΩ}$$

After the internal resistance $R_{BIR}$ of the battery 2 and the internal capacitance $C_{BAT}$ of the battery 2 are calculated, the battery charging circuit 1 charges the battery 2 in a fast charging mode.

In the present embodiment, the fast charging mode for the battery 2 provides the charging current and suitable voltage detection points according to the internal resistance $R_{BIR}$ and the internal capacitance $C_{BAT}$ of the battery 2. In the present embodiment, the battery charging circuit 1 continues to provide the charging current Icc to charge the battery 2 until the external terminal voltage $V_{BATO}$ of the battery 2 reaches a second pre-determined voltage $V_{O2}$. The charging current Icc drops after the battery external terminal voltage $V_{BATO}$ reaches the second pre-determined voltage $V_{O2}$. The second pre-determined voltage $V_{O2}$ is determined according to the battery internal resistance $R_{BIR}$ and the charging current Icc. In the present embodiment, the second pre-determined voltage $V_{O2}$ equals the sum of the rated fully-charged voltage $V_{OREG}$ and the voltage across battery internal resistor $V_{BIR}$. $V_{BIR}$ equals Icc*$R_{BIR}$.

That is, the voltage across battery internal resistor $V_{BIR}$ equals the current value Icc multiplied by the battery internal resistance $R_{BIR}$. Therefore, the voltage across battery internal capacitor ($V_{BAT}$) equals the rated fully-charged voltage $V_{OREG}$, and the battery 2 is completely charged. In other words, as indicated by the voltage curve at the fifth time $T_5$ in FIG. 5, the charging current starts to drop at the fifth time $T_5$ until it reaches zero.

According to the charging process of the battery 2 by the battery charging circuit 1, the battery charging circuit 1 provides effective charging parameters to speed up the charging process based on the internal parameters of the battery 2. In the present embodiment, the internal parameters of the battery 2 include, for example, the battery internal resistance $R_{BIR}$, the battery internal capacitance $C_{BAT}$, etc., which can be stored in the storage module 13.

Embodiment of Battery Charging Method

Figure 6:
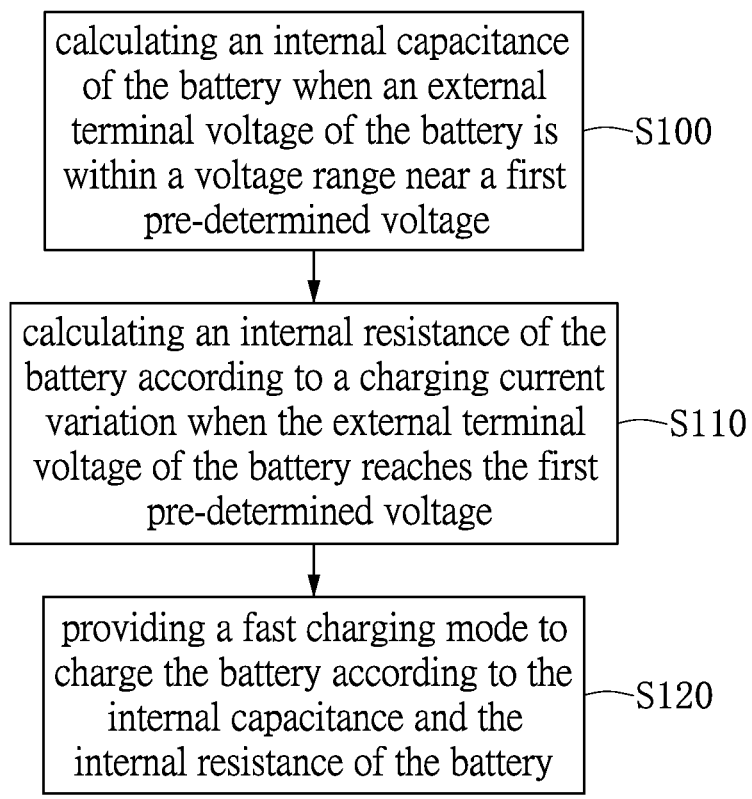
FIG. 6 shows a flowchart of a battery charging method according to one embodiment of the present disclosure.

Referring to FIG. 6, FIG. 6 shows a flowchart of a battery charging method according to one embodiment of the present disclosure.

In the present embodiment, the battery charging method can be used with the previously disclosed battery charging circuit 1 and battery 2, and detailed descriptions thereof are not repeated.

The present disclosure provides a battery charging method for charging a battery 2. The battery charging method of the present embodiment includes the following steps. In Step S100, an internal capacitance of the battery is calculated when an external terminal voltage of the battery is within a voltage range near a first pre-determined voltage. In Step S110, an internal impedance of the battery is calculated according to a charging current variation when the external terminal voltage of the battery reaches the first pre-determined voltage. In Step S120, a fast charging mode is provided to charge the battery according to the internal capacitance and the internal impedance of the battery.

In Step S100, the battery charging circuit 1 charges the battery 2 in a constant-current mode. Meanwhile, the battery charging circuit 1 charges the battery 2 with a charging current Icc such that the external terminal voltage $V_{BATO}$ of the battery 2 continues to increase. When the external terminal voltage $V_{BATO}$ of the battery 2 increases to approach a pre-determined voltage range, the detecting unit 122 detects a voltage variation ΔV of the battery 2. In the present embodiment, the pre-determined voltage range is determined between the system voltage Vsys and the rated fully-charged voltage $V_{OREG}$. Moreover, in the present embodiment, the pre-determined voltage range is higher than 90% of the rated fully-charged voltage $V_{OREG}$. In other embodiments, the voltage range can be determined different from the present embodiment, to which the present disclosure is not limited. In the present embodiment, the system voltage Vsys is a system voltage enabling an electronic device to operate normally.

Moreover, the internal capacitance $C_{BAT}$ of the battery 2 can be calculated according to Equation (3). In the present embodiment, the first pre-determined voltage is a rated fully-charged voltage $V_{OREG}$.

In Step S110, when the external terminal voltage $V_{BATO}$ of the battery 2 reaches a first pre-determined voltage, i.e., the rated fully-charged voltage $V_{OREG}$ in the present embodiment, the charging unit 121 of the battery charging circuit 1 starts to lower the charging current at the third time $T_3$ until the charging current drops to 90% of the current value Icc at the fourth time $T_4$. Then, the control module 11 of the battery charging circuit 1 can calculate the internal resistance $R_{BIR}$ of the battery 2 according to the current variation (10% variation of the charging current Icc) between the third time $T_3$ and the fourth time $T_4$, which can be expressed as Equation (4).

In Step S120, after the internal resistance $R_{BIR}$ of the battery 2 and the internal capacitance $C_{BAT}$ of the battery 2 are calculated, the battery charging circuit 1 can provide the fast charging mode to charge the battery 2.

In the present embodiment, the fast charging mode for the battery 2 provides the charging current and suitable voltage detection points according to the internal resistance $R_{BIR}$ and the internal capacitance $C_{BAT}$ of the battery 2. In the present embodiment, the battery charging circuit 1 continues to provide the charging current Icc to charge the battery 2 until the external terminal voltage $V_{BATO}$ of the battery 2 reaches the second pre-determined voltage $V_{O2}$. The battery external terminal voltage $V_{BATO}$ drops after it reaches the second pre-determined voltage $V_{O2}$. The charging current Icc drops after the battery external terminal voltage $V_{BATO}$ reaches the second pre-determined voltage $V_{O2}$. The second pre-determined voltage $V_{O2}$ is determined according to the battery internal resistance $R_{BIR}$ and the charging current Icc. In the present embodiment, the second pre-determined voltage $V_{O2}$ equals the sum of the rated fully-charged voltage $V_{OREG}$ and the voltage across battery internal resistor $V_{BIR}$. The voltage across battery internal resistor $V_{BIR}$ equals Icc*$R_{BIR}$.

Figure 7:
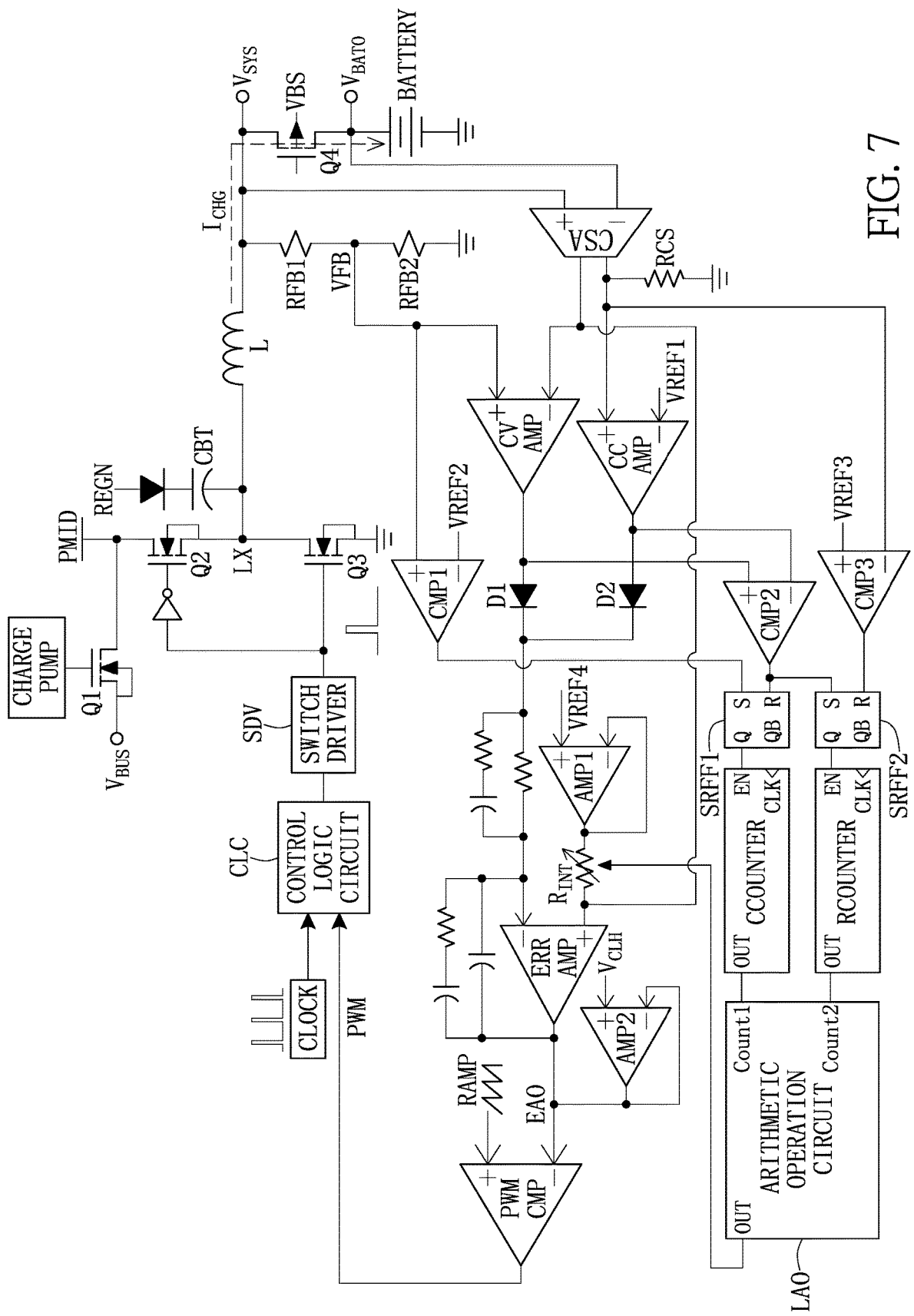
FIG. 7 shows a schematic diagram of a battery charging circuit according to another embodiment of the present disclosure.

Reference is made to FIG. 7, which shows a schematic diagram of a battery charging circuit according to another embodiment of the present disclosure.

As shown in FIG. 7, the battery charging circuit includes a charging unit and a detecting unit, which are connected to a battery BATTERY and configured for detecting and charging the battery BATTERY. The battery BATTERY includes a battery internal resistor and a battery internal capacitor. For example, the battery internal resistor $R_{BIR}$ and the battery internal capacitor $C_{BAT}$ are as shown in FIG. 3. The battery internal resistor $R_{BIR}$ and the battery internal capacitor $C_{BAT}$ are connected to each other.

The charging unit includes a current sensor amplifier CSA, a charge voltage amplifier CVAMP, a charge current amplifier CCAMP, a first diode D1, a second diode D2, an error amplifier ERRAMP, a pulse width modulation (PWM) comparator PWMCMP, a clock circuit CLOCK, a control logic circuit CLC, a switch driver SDV, a switch circuit including first to fourth transistors Q1 to Q4, an inductor L, a capacitor CBT, a voltage divider circuit, and a second amplifier AMP2.

It is worth noting that, the detecting unit includes a first comparator CMP1, a second comparator CMP2, a third comparator CMP3 a first flip flop SRFF1 and a second flip flop SRFF2, a capacitor counter CCOUNTER, a resistor counter RCOUNTER, an arithmetic operation circuit LAO, a first amplifier AMP1, an adjustable resistor $R_{INT}$.

One terminal of the inductor L is connected to a node between the second transistor Q2 and the third transistor Q3 of the switch circuit. The other terminal of the inductor L is connected to the battery BATTERY and the voltage divider circuit. A first terminal of the fourth transistor Q4 is connected to the other terminal of the inductor L and a second terminal of the fourth transistor Q4 is connected to the battery BATTERY.

The voltage divider circuit includes a first feedback resistor RFB1 and a second feedback resistor RFB2 which are connected in series to each other. The fourth transistor Q4 is connected in series to the battery BATTERY. The voltage divider circuit is configured to supply a feedback voltage VFB based on a voltage at a node between the inductor L and the voltage divider circuit and between the inductor L and the fourth transistor Q4.

The current sensor amplifier CSA is connected to the first terminal of the fourth transistor Q4 and the second terminal of the fourth transistor Q4. The current sensor amplifier CSA detects a charging current $I_{CHG}$ flowing through the fourth transistor Q4 before the charging current $I_{CHG}$ flowing to the battery BATTERY and outputs a sensed charging current according to the sensed charging current $I_{CHG}$.

The charge voltage amplifier CVAMP has a first voltage input terminal and a second voltage input terminal. The first voltage input terminal such as a non-inverting terminal of the charge voltage amplifier CVAMP is connected to a node between the first feedback resistor RFB1 and the second feedback resistor RFB2 and receives the feedback voltage VFB from the voltage divider circuit. The second voltage input terminal such as an inverting terminal of the charge voltage amplifier CVAMP is connected to the current sensor amplifier CSA and the adjustable resistor $R_{INT}$, and receives the sensed charging current from the current sensor amplifier CSA. The charge voltage amplifier CVAMP outputs a voltage amplified signal according to the feedback voltage VFB from the voltage divider circuit and a voltage of the sensed charging current multiplied by the adjustable resistor $R_{INT}$.

The charge current amplifier CCAMP has a first current input terminal and a second current input terminal. The first current input terminal such as a non-inverting terminal of the charge current amplifier CCAMP is connected to the current sensor amplifier CSA and one terminal of a resistor RCS. The other terminal of the resistor RCS is grounded. The resistor RCS receives the sensed charging current from the current sensor amplifier CSA.

The first current input terminal such as the non-inverting terminal of the charge current amplifier CCAMP obtains a voltage at the one terminal of the resistor RCS. The second current input terminal such as an inverting terminal of the charge current amplifier CCAMP is connected to a first reference voltage source and receives a first reference voltage VREF1 from the first reference voltage source. The charge current amplifier CCAMP outputs a current amplified signal according to the first reference voltage VREF1 and the voltage of the resistor RCS.

The error amplifier ERRAMP has a first error input terminal and a second error input terminal. The first error input terminal such as an inverting terminal of the error amplifier ERRAMP is connected to an output terminal of the charge voltage amplifier CVAMP and an output terminal of the charge current amplifier CCAMP. The second error input terminal such as a non-inverting terminal of the error amplifier ERRAMP is connected to the adjustable resistor $R_{INT}$, the current sensor amplifier CSA and the charge voltage amplifier CVAMP.

In detail, the first diode D1 is connected between the error amplifier ERRAMP and the charge voltage amplifier CVAMP. The first diode D1 has a first positive terminal connected to the output terminal of the charge voltage amplifier CVAMP. The first diode D1 has a first negative terminal connected to the first error input terminal such as the inverting terminal of the error amplifier ERRAMP.

The second diode D2 is connected between the error amplifier ERRAMP and the charge current amplifier CCAMP. The second diode D2 has a second positive terminal connected to the output terminal of the charge current amplifier CCAMP. The second diode D2 has a second negative terminal connected to the first error input terminal such as the inverting terminal of the error amplifier ERRAMP.

The first comparator CMP1 has a first comparator input terminal and a second comparator input terminal. The first comparator input terminal such as a non-inverting terminal of the first comparator CMP1 is connected to the node between the first feedback resistor RFB1 and the second feedback resistor RFB2 of the voltage divider circuit and receives the feedback voltage VFB from the voltage divider circuit. The second comparator input terminal such as an inverting terminal of the first comparator CMP1 is connected to a second reference voltage source and receives a second reference voltage VREF2 from the second reference voltage source. The first comparator CMP1 outputs a first comparator signal according to the feedback voltage VFB and the second reference voltage VREF2.

The second comparator CMP2 has a third comparator input terminal and a fourth comparator input terminal. The third comparator input terminal such as a non-inverting terminal of the second comparator CMP2 is connected to a node between the output terminal of the charge voltage amplifier CVAMP and the first positive terminal of the first diode D1. The fourth comparator input terminal such as an inverting terminal of the second comparator CMP2 is connected to a node between the output terminal of the charge current amplifier CCAMP and the second positive terminal of the second diode D2. The second comparator CMP2 outputs a second comparator signal according to the current amplified signal and the voltage amplified signal.

The third comparator CMP3 has a fifth comparator input terminal and a sixth comparator input terminal. The fifth comparator input terminal such as a non-inverting terminal of the third comparator CMP3 is connected to a third reference voltage source and receives a third reference voltage VREF3 from the third reference voltage source. The sixth comparator input terminal such as an inverting terminal of the third comparator CMP3 is connected to the one terminal of the resistor RCS and the output terminal of the current sensor amplifier CSA. The third comparator CMP3 outputs a third comparator signal according to a voltage of the sensed charging current multiplied by the resistor RCS and the third reference voltage VREF3.

For example, the first flip flop SRFF1 may be a SR flip flop, but the present disclosure is not limited thereto. The first flip flop SRFF1 has a first input terminal such as a set terminal S connected to an output terminal of the first comparator CMP1 and configured to receive the first comparator signal from the first comparator CMP1. The first flip flop SRFF1 has a second input terminal such as a reset terminal R connected to an output terminal of the second comparator CMP2 and configured to receive the second comparator signal from the second comparator CMP2. An output terminal Q of the first flip flop SRFF1 is connected to an enable terminal EN of the capacitor counter CCOUNTER.

For example, the second flip flop SRFF2 may be a SR flip flop, but the present disclosure is not limited thereto. The second flip flop SRFF2 has a third input terminal such as a set terminal S connected to the output terminal of the second comparator CMP2 and configured to receive the second comparator signal from the second comparator CMP2. The second flip flop SRFF2 has a fourth input terminal such as a reset terminal R connected to an output terminal of the third comparator CMP3 and configured to receive the third comparator signal from the third comparator CMP3. An output terminal Q of the second flip flop SRFF2 is connected to an enable terminal EN of the resistor counter RCOUNTER.

An output terminal OUT of the capacitor counter CCOUNTER is connected to a first count input terminal COUNT1 of the arithmetic operation circuit LAO. An output terminal OUT of the resistor counter RCOUNTER is connected to a second count input terminal COUNT2 of the arithmetic operation circuit LAO. An output terminal OUT of the arithmetic operation circuit LAO is connected to or contacted with a control terminal of the adjustable resistor $R_{INT}$.

The first flip flop SRFF1 outputs a first flip flop signal to the capacitor counter CCOUNTER according to the first comparator signal from the first comparator CMP1 and the second comparator signal from the second comparator CMP2. The second flip flop SRFF2 outputs a second flip flop signal to the resistor counter RCOUNTER according to the second comparator signal from the second comparator CMP2 and the third comparator signal from the third comparator CMP3.

When the capacitor counter CCOUNTER is enabled by the first flip flop signal from the first flip flop SRFF1, the capacitor counter CCOUNTER outputs a capacitor counting signal. When the resistor counter RCOUNTER is enabled by the second flip flop signal from the second flip flop SRFF2, the resistor counter RCOUNTER outputs a resistor counting signal. The arithmetic operation circuit LAO outputs a resistor adjusting signal to the control terminal of the adjustable resistor $R_{INT}$ according to the capacitor counting signal from the capacitor counter CCOUNTER and the resistor counting signal from the resistor counter RCOUNTER.

The first amplifier AMP1 has a first amplifier input terminal such as an inverting terminal connected to an output terminal of the first amplifier AMP1 and one terminal of the adjustable resistor $R_{INT}$. The first amplifier AMP1 outputs an amplifier signal according to an output voltage of the first amplifier AMP1 and a fourth reference voltage VREF4 from the fourth reference voltage source. The first amplifier AMP1 has a second amplifier input terminal such as a non-inverting terminal connected to a fourth reference voltage source and receives a fourth reference voltage VREF4 from the fourth reference voltage source.

For example, the third reference voltage VREF3 is equal to 90% of the first reference voltage VREF1 and the second reference voltage VREF2 is equal to 90% of the fourth reference voltage VREF4. In practice, 90% may be replaced with another ratio, the present disclosure is not limited thereto.

The adjustable resistor $R_{INT}$ is connected between a second error input terminal such as the non-inverting terminal of the error amplifier ERRAMP and the output terminal of the first amplifier AMP1. In other words, the one terminal of the adjustable resistor $R_{INT}$ is connected to the output terminal of the first amplifier AMP1 and other terminal of the adjustable resistor $R_{INT}$ is connected to the second error input terminal of the error amplifier ERRAMP. In addition, the second error input terminal of the error amplifier ERRAMP may be connected to the output terminal of the current sensor amplifier CSA.

It is worth noting that, the adjustable resistor $R_{INT}$ is adjusted to have a resistance that is equal to that of the battery internal resistor of the battery BATTERY according to the resistor adjusting signal outputted by the arithmetic operation circuit LAO.

The error amplifier ERRAMP outputs an error amplified signal EAO according to the capacitor counting signal or the resistor counting signal and a voltage at the other terminal of the adjustable resistor $R_{INT}$. The PWM comparator PWMCMP outputs a pulse width modulation signal PWM according to a ramp signal RAMP from a ramp circuit and the error amplified signal EAO.

The control logic circuit CLC is connected to the PWM comparator PWMCMP, the clock circuit CLOCK and the switch driver SDV. The control logic circuit CLC receives the pulse width modulation signal PWM from the PWM comparator PWMCMP and a clock signal from the clock circuit CLOCK. The control logic circuit CLC outputs a control signal to the switch driver SDV according to the pulse width modulation signal PWM and the clock signal.

The switch driver SDV is connected to a control terminal of the second transistor Q2 and a control terminal of the third transistor Q3 of the switch circuit. The switch driver SDV turns on or off the second transistor Q2 and the third transistor Q3 according to the control signal from the control logic circuit CLC such that the charging current $I_{CHG}$ is supplied to or stops being supplied to the battery BATTERY.

Figure 8A:
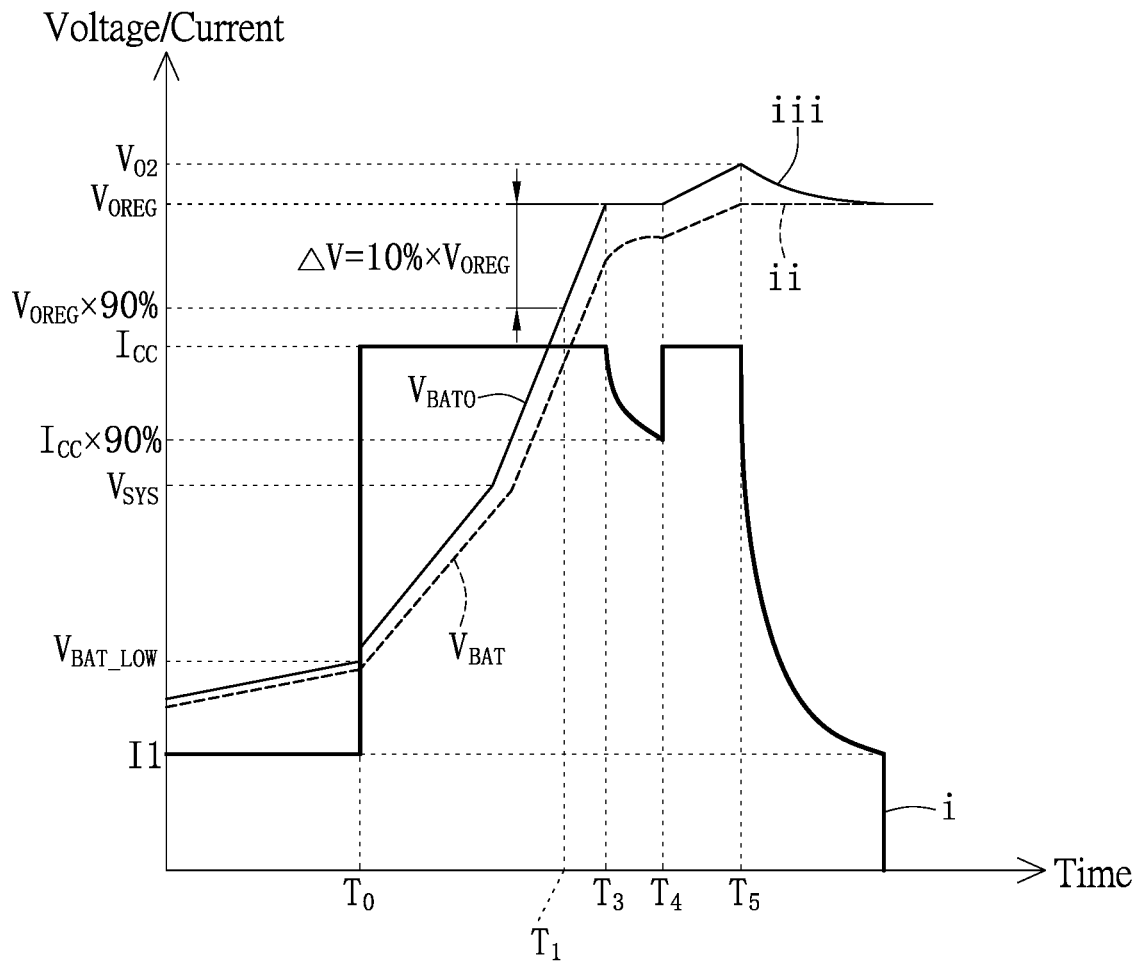
FIG. 8A shows a charging voltage profile and a charging current profile during the charging process of the battery charging circuit according to another embodiment of the present disclosure.
Figure 8B:
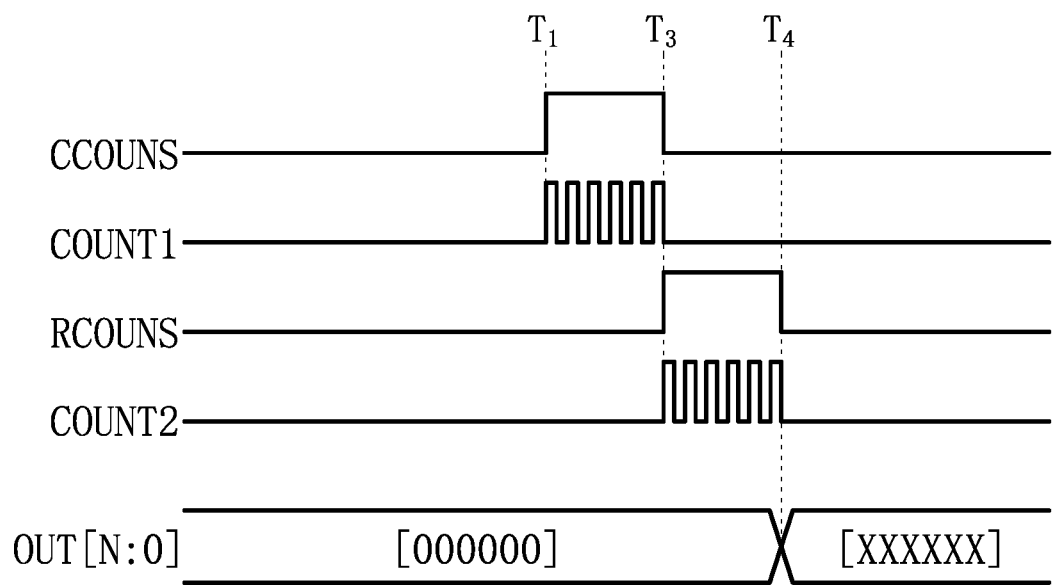
FIG. 8B shows a waveform diagram of flip flop signals, a capacitor counting signal and a resistor counting signal of the battery charging circuit according to another embodiment of the present disclosure.

Reference is further made to FIGS. 8A and 8B, FIG. 8A shows a charging voltage profile and a charging current profile during the charging process of the battery charging circuit according to another embodiment of the present disclosure, and FIG. 8B shows a waveform diagram of flip flop signals, a capacitor counting signal and a resistor counting signal of the battery charging circuit according to another embodiment of the present disclosure.

As shown in FIG. 8A, $V_{O2}$ represents the second pre-determined voltage. $V_{OREG}$ represents a saturation voltage of the battery BATTERY. $I_{CC}$ represents a current supplied to the battery BATTERY. $V_{BAT}$ represents a voltage of the battery BATTERY. The second pre-determined voltage is higher than the saturation voltage $V_{OREG}$.

It should be note that, the voltage of the battery BATTERY includes a voltage of the battery internal resistor $R_{BIR}$ and a battery internal capacitor $C_{BAT}$. Therefore, when the battery BATTERY is charged to have the saturation voltage $V_{OREG}$, the voltage of the battery internal capacitor $C_{BAT}$ does not reach the pre-determined voltage $V_{OREG}$ due to the battery internal resistor $R_{BIR}$ voltage drop.

In order to charge the battery internal capacitor $C_{BAT}$ to have the pre-determined voltage $V_{OREG}$, the adjustable resistor $R_{INT}$ is provided as shown in FIG. 7. It is worth noting that the adjustable resistor $R_{INT}$ is adaptively adjusted to have the resistance that is equal to that of the battery internal resistor of the battery BATTERY by the arithmetic operation circuit LAO. As such, the voltage of the battery BATTERY can be raised and charged to the second pre-determined voltage $V_{O2}$. That is, the voltage of the battery internal capacitor $C_{BAT}$ is charged to the pre-determined voltage $V_{OREG}$.

As shown in FIG. 8B, CCOUNTS represents the first flip flop signal outputted by the first flip flop SRFF1 shown in FIG. 7. COUNT1 represents the capacitor counting signal outputted by the capacitor counter CCOUNTER shown in FIG. 7. RCOUNTS represents the second flip flop signal outputted by the second flip flop SRFF2 shown in FIG. 7. COUNT2 represents the resistor counting signal outputted by the resistor counter RCOUNTER shown in FIG. 7.

When the voltage of the battery BATTERY or the feedback voltage VFB shown in FIG. 7 is charged to be equal to a voltage that is 90% of the saturation voltage $V_{OREG}$ shown in FIG. 8A, the capacitor counter CCOUNTER is enabled by the first flip flop signal CCOUNTS outputted by the first flip flop SRFF1 and starts to count at a time point T1 as shown in FIG. 8B. Then, when the voltage of the battery BATTERY or the feedback voltage VFB is charged to be equal to the saturation voltage $V_{OREG}$, the capacitor counter CCOUNTER stops counting at a time point T3. The capacitor counter CCOUNTER outputs the capacitor counting signal indicating the time point T1 and the time point T3, a time interval between the time point T1 and the time point T3, the number of clocks counted during the time interval, or a combination thereof.

When the resistor counter RCOUNTER is enabled by the second flip flop signal RCOUNTS outputted by the second flip flop SRFF2, the resistor counter RCOUNTER starts to count at the time point T3 at which the charging current $I_{CHG}$ shown in FIG. 7 starts to decrease from the current $I_{CC}$. The charging current $I_{CHG}$ declines during a time interval between the time point T3 and a time point T4. The resistor counter RCOUNTER stops counting at the time point T4. The resistor counter RCOUNTER outputs the resistor counting signal indicating the time point T3 and the time point T4, the time interval between the time point T3 and the time point T4, the number of clocks counted during the time interval, or a combination thereof.

The arithmetic operation circuit LAO calculates the capacitance of the battery internal capacitor $C_{BAT}$ shown in FIG. 3 of the battery BATTERY according to the capacitor counting signal. In detail, the capacitance of the battery internal capacitor is calculated by the following equations:

$$I_{CHG} \times T_{COUNT1} = C_{BATTERY} \times V_{OREG}(100\%-90\%),$$

$$C_{BATTERY} = (I_{CHG} \times T_{COUNT1})/V_{OREG}(100\%-90\%),$$

wherein $I_{CHG}$ represents the charging current $I_{CHG}$ shown in FIG. 7, $T_{COUNT1}$ represents a length of the time interval between the time point T1 and the time point T3, $C_{BATTERY}$ represents the capacitance of the battery internal capacitor $C_{BAT}$ of the battery BATTERY, and $V_{OREG}$ represents the saturation voltage of the battery BATTERY.

The arithmetic operation circuit LAO calculates the resistance of the battery internal resistor $R_{BIR}$ of the battery BATTERY according to the resistor counting signal. In detail, the resistance of the battery internal resistor is calculated by the following equations:

$$T_{COUNT2} = 0.1 \times (C_{BATTERY} \times R_{INT}),$$

$$R_{INT} = T_{COUNT2}/(0.1 \times C_{BATTERY}),$$

wherein $T_{COUNT2}$ represents a length of the time interval between the time point T3 and the time point T4, that is to say, this time interval is from 100% of the $I_{CC}$ to 90% of the $I_{CC}$. $I_{CC}$ represents the charging current flowing through the battery internal capacitor $C_{BAT}$ and the battery internal resistor $R_{BIR}$ of the battery BATTERY when the battery is in the charging progress, $C_{BATTERY}$ represents the capacitance of the battery internal capacitor $C_{BAT}$ of the battery BATTERY, $R_{INT}$ represents the resistance of the battery internal resistor $R_{BIR}$ of the battery BATTERY.

The arithmetic operation circuit LAO outputs the resistor adjusting signal to the control terminal of the adjustable resistor $R_{INT}$, according to the calculated capacitance of the battery internal capacitor $C_{BAT}$ of the battery BATTERY and the calculated resistance of the battery internal resistor $R_{BIR}$ of the battery BATTERY. As a result, the adjustable resistor is adjusted to have the resistance that is equal to that of the battery internal resistor $R_{BIR}$ of the battery BATTERY according to the resistor adjusting signal. In this way, the battery internal capacitor $C_{BAT}$ of the battery BATTERY can be further charged to the second pre-determined voltage $V_{O2}$ from the saturation voltage $V_{OREG}$ with the setting charging current 100% of the $I_{CC}$ during a time interval between the time point T4 and a time point T5.

For example, in the embodiment, the battery BATTERY is charged to have the second pre-determined voltage $V_{O2}$ that is equal to a sum of the saturation voltage $V_{OREG}$ of the battery BATTERY and the voltage of the battery internal resistor $R_{BIR}$ of the battery BATTERY. However, in practice, the battery BATTERY may be charged to have the second pre-determined voltage $V_{O2}$ that is larger than the sum of the saturation voltage $V_{OREG}$ and the voltage of the battery internal resistor $R_{BIR}$.

Figure 9:
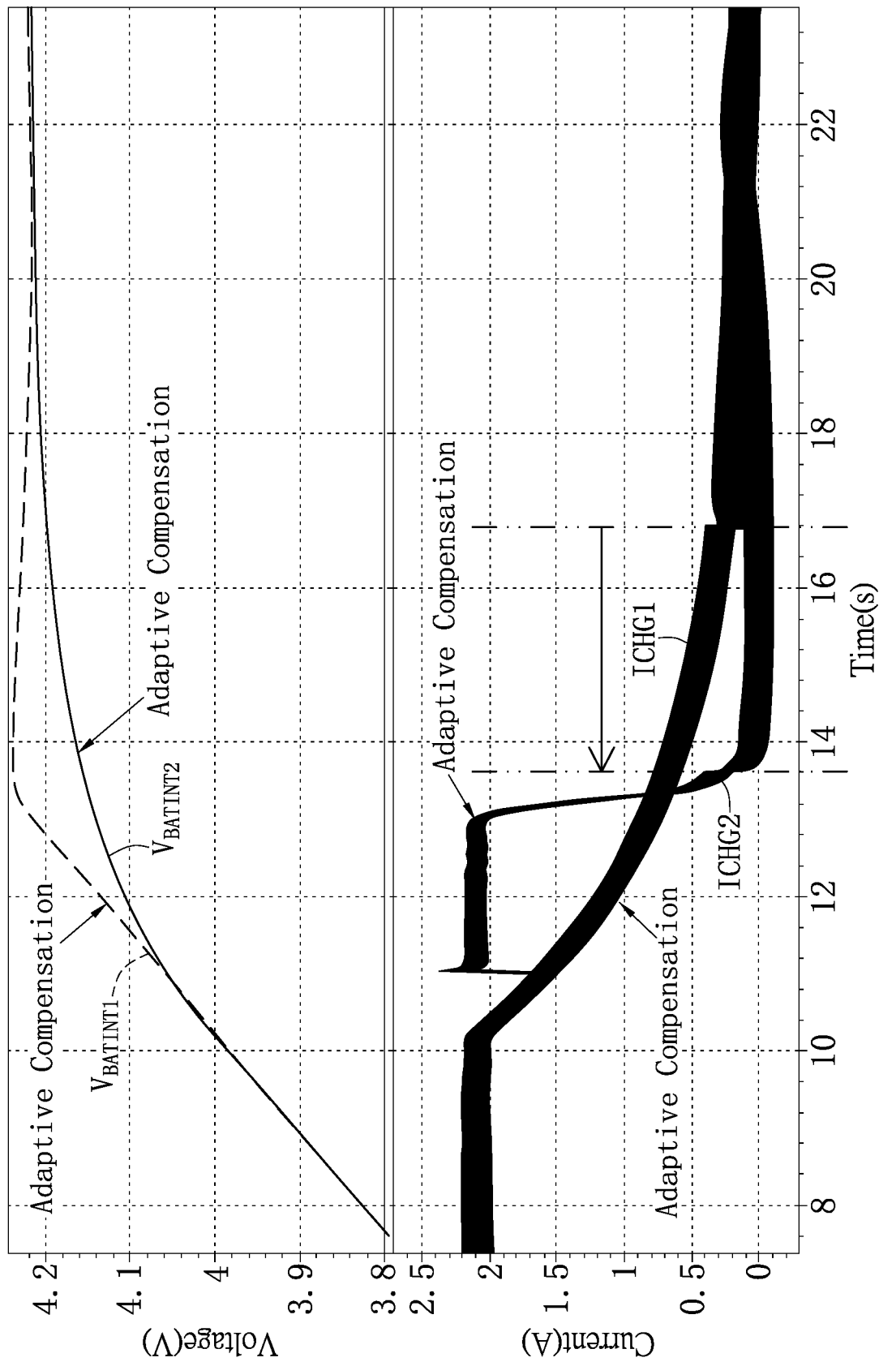
FIG. 9 shows a comparison waveform diagram of a charging voltage of a battery and a charging current flowing to the battery from the battery charging circuit according to another embodiment of the present disclosure and a general charging circuit.

Reference is made to FIG. 9, which shows a comparison waveform diagram of a charging voltage of a battery and a charging current flowing to the battery from the battery charging circuit according to another embodiment of the present disclosure and a general charging circuit.

As shown in FIG. 9, a charging voltage $V_{BATO1}$ and a charging current $I_{CHG1}$ of a battery cannot be adaptively compensated by the general charging circuit. In contrast, in the embodiment, the resistance of the battery internal resistor $R_{BIR}$ of the battery BATTERY is detected by the battery charging circuit shown in FIG. 7. The saturation voltage of the battery BATTERY is increased according to the voltage equal to the resistance of the battery internal resistor $R_{BIR}$ multiplied by a charging current $I_{CHG2}$ flowing through the battery BATTERY by the battery charging circuit shown in FIG. 7. Therefore, the charging voltage $V_{BATO2}$ of the battery BATTERY and the charging current $I_{CHG2}$ flowing to the battery BATTERY can be compensated adaptively by the battery charging circuit shown in FIG. 7. Thus, the charging time of the battery BATTERY with adaptively compensation is decreased dramatically.

As previously stated, the battery charging circuit according to the present disclosure is capable of adaptively detecting the internal resistance and the internal capacitance of a battery during various charging periods to acquire actual parameters of the battery so as to provide a fast charging mode to charge the battery with shortened charging time in the constant-voltage mode.

The above-mentioned descriptions represent merely the exemplary embodiment of the present disclosure, without any intention to limit the scope of the present disclosure thereto. Various equivalent changes, alterations or modifications based on the claims of present disclosure are all consequently viewed as being embraced by the scope of the present disclosure.

What is claimed is:

1. A battery charging circuit for detecting and charging a battery, the battery including a battery internal resistor and a battery internal capacitor that are connected to each other, the battery charging circuit comprising:
   a charging unit including:
      a switch circuit connected to the battery and configured to supply a charging current to the battery;
      a voltage divider circuit connected to the battery and configured to output a feedback voltage based on a voltage of the battery;
      a current sensor amplifier connected to the battery and configured to detect the charging current flowing to the battery to output a sensed charging current;
      a charge voltage amplifier connected to the voltage divider circuit and the current sensor amplifier and configured to output a voltage amplified signal according to the feedback voltage and a voltage related to the sensed charging current and an adjustable resistor;
      a charge current amplifier connected to the current sensor amplifier and configured to output a current amplified signal according to the sensed charging current and a first reference voltage;
      an error amplifier having a first error input terminal connected to the charge voltage amplifier and the charge current amplifier, and a second error input terminal connected to the current sensor amplifier, the charge voltage amplifier and the adjustable resistor; and a pulse width modulation (PWM) comparator connected to the error amplifier and a ramp circuit; and a detecting unit including:
- a first comparator connected to the voltage divider circuit and configured to output a first comparator signal according to the feedback voltage and a second reference voltage;
- a second comparator connected to the charge current amplifier and the charge voltage amplifier and configured to output a second comparator signal according to the current amplified signal and the voltage amplified signal;
- a third comparator connected to the current sensor amplifier and configured to output a third comparator signal according to the sensed charging current and a third reference voltage;
- a capacitor counter connected to the first comparator and the second comparator and configured to output a capacitor counting signal according to the first comparator signal and the second comparator signal;
- a resistor counter connected to the second comparator and the third comparator and configured to output a resistor counting signal according to the second comparator signal and the third comparator signal;
- an arithmetic operation circuit connected to the capacitor counter and the resistor counter and configured to output a resistor adjusting signal according to the capacitor counting signal and the resistor counting signal;
- a first amplifier has a first amplifier input terminal connected to an output terminal of the first amplifier and configured to output an amplifier signal according to an output voltage of the first amplifier and a fourth reference voltage; and
- the adjustable resistor having one terminal connected to the output terminal of the first amplifier, other terminal connected to the second error input terminal and a control terminal connected to the arithmetic operation circuit, a resistance of the adjustable resistor is adjusted to be equal to that of the battery internal resistor according to the resistor adjusting signal;

wherein the error amplifier outputs an error amplified signal to the PWM comparator according to the voltage amplified signal or the current amplified signal and the one terminal of the adjustable resistor, and the PWM comparator outputs a pulse width modulation signal to the switch circuit according to a ramp signal from the ramp circuit and the error amplified signal.

2. The battery charging circuit of claim 1, wherein the detecting unit further including:
- a first flip flop having a first input terminal connected to an output terminal of the first comparator, a second input terminal connected to an output terminal of the second comparator, and an output terminal connected to the capacitor counter; and
- a second flip flop having a third input terminal connected to an output terminal of the second comparator, a fourth input terminal connected to an output terminal of the third comparator, and an output terminal connected to the resistor counter.

3. The battery charging circuit of claim 1, wherein the charging unit further including:
- a first diode having a first positive terminal connected to an output terminal of the charge voltage amplifier and a first negative terminal connected to the first error input terminal of the error amplifier; and
- a second diode having a second positive terminal connected to an output terminal of the charge current amplifier and a second negative terminal connected to the first error input terminal of the error amplifier.

4. The battery charging circuit of claim 1, wherein the charging unit further including:
- a transistor connected in series to the battery, and having a first transistor input terminal connected to a node between the switch circuit and the voltage divider circuit and a second transistor input terminal connected to the battery;
- wherein the current sensor amplifier is connected to the first transistor input terminal and the second transistor input terminal of the transistor, and configured to detect the charging current flowing through the transistor to output the sensed charging current.

5. The battery charging circuit of claim 1, wherein the second reference voltage is equal to 90% of the fourth reference voltage.

6. The battery charging circuit of claim 1, wherein the third reference voltage is equal to 90% of the second reference voltage.

7. The battery charging circuit of claim 1, wherein a voltage of the battery is charged to be larger than a saturation voltage of the battery including the battery internal resistor and the battery internal capacitor.

8. The battery charging circuit of claim 1, wherein the battery is charged to have a pre-determined voltage that is equal to or larger than a sum of a saturation voltage of the battery and a voltage of the battery internal resistor of the battery.

* * * * *